(12) United States Patent
Fan

(10) Patent No.: US 10,268,072 B2
(45) Date of Patent: Apr. 23, 2019

(54) BACKLIGHT MODULE AND LIQUID CRYSTAL DISPLAY

(71) Applicant: Shenzhen China Star Optoelectronics Technology Co., Ltd., Shenzhen (CN)

(72) Inventor: Yong Fan, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/553,498

(22) PCT Filed: Jun. 28, 2017

(86) PCT No.: PCT/CN2017/090636
§ 371 (c)(1),
(2) Date: Aug. 24, 2017

(87) PCT Pub. No.: WO2018/157527
PCT Pub. Date: Sep. 7, 2018

(65) Prior Publication Data
US 2018/0246377 A1 Aug. 30, 2018

(30) Foreign Application Priority Data
Feb. 28, 2017 (CN) .......................... 2017 1 0114526

(51) Int. Cl.
*G02F 1/1335* (2006.01)
*G02B 6/00* (2006.01)
*F21V 8/00* (2006.01)

(52) U.S. Cl.
CPC ......... *G02F 1/133603* (2013.01); *G02B 6/00* (2013.01); *G02B 6/0035* (2013.01);
(Continued)

(58) Field of Classification Search
CPC ......... G02F 1/133603; G02F 1/133605; G02F 1/133611; G02F 2001/133614;
(Continued)

(56) References Cited

U.S. PATENT DOCUMENTS

2012/0228652 A1* 9/2012 Chang ...................... F21K 9/90
257/98
2013/0155494 A1* 6/2013 Chen .................... G02B 27/285
359/352
(Continued)

FOREIGN PATENT DOCUMENTS

| CN | 101451673 A | 6/2009 |
|----|-------------|--------|
| CN | 203069818 U | 7/2013 |

(Continued)

*Primary Examiner* — Anh T Mai
*Assistant Examiner* — Glenn D Zimmerman
(74) *Attorney, Agent, or Firm* — Mintz Levin Cohn Ferris Glovsky and Popeo, P.C.; Kongsik Kim; Jhongwoo Jay Peck

(57) ABSTRACT

A technical field of liquid crystal display, and particularly, to a backlight module including a reflection sheet, a light guide plate and an optical film group disposed from bottom to top, a quantum dot film group disposed between the light guide plate and the optical film group, a light source disposed to correspond to a side portion of the light guide plate. The light source having an excitation light source and a compensation light source, wherein the excitation light source is used to provide excitation light to enable the quantum dot film group to emit excitation red light and excitation green light entering the optical film group. The compensation light source is used to provide compensation blue light to enable the quantum dot film group to emit blue light entering the optical film group.

11 Claims, 3 Drawing Sheets

(52) U.S. Cl.
CPC ..... *G02B 6/0055* (2013.01); *G02F 1/133605* (2013.01); *G02F 1/133611* (2013.01); *G02F 1/133617* (2013.01); *G02F 2001/133614* (2013.01); *G02F 2001/133624* (2013.01)

(58) Field of Classification Search
CPC ... G02F 1/133617; G02F 2001/133624; G02B 6/0055; G02B 6/00; G02B 6/0035
See application file for complete search history.

(56) References Cited

U.S. PATENT DOCUMENTS

| | | | |
|---|---|---|---|
| 2014/0211507 A1* | 7/2014 | Notermans | G02B 6/0088 362/615 |
| 2015/0029439 A1 | 1/2015 | Kim et al. | |
| 2015/0176804 A1* | 6/2015 | Song | G02F 1/133615 349/65 |
| 2018/0203300 A1* | 7/2018 | Lin | G02F 1/133602 |

FOREIGN PATENT DOCUMENTS

| | | |
|---|---|---|
| CN | 103278961 A | 9/2013 |
| CN | 103698937 A | 4/2014 |
| CN | 106597753 A | 4/2017 |

\* cited by examiner

BACKLIGHT MODULE AND LIQUID CRYSTAL DISPLAY

CROSS-REFERENCE TO RELATED APPLICATION

This application is the U.S. national phase of PCT Application No. PCT/CN2017/090636 filed on Jun. 28, 2017, which claims priority to CN Patent Application No. 201710114526.6 filed on Feb. 28, 2017, the disclosures of which are incorporated in their entirety by reference herein.

TECHNICAL FIELD

The present invention belongs to the technical field of liquid crystal display, and more particularly, to a new type of backlight module and a liquid crystal display.

DESCRIPTION OF THE RELATED ART

With the development of technology and the improvement of people's demand for life, people have a growing demand on the image quality of a liquid crystal display (LCD). Quantum dots are applied to the LCD because of having characteristics of adjustable luminescence spectrum, narrow full width at half maximum (FWHM), high light emission efficiency and the like, which may significantly improve the color gamut of the LCD.

The quantum dots can be divided into quantum dots containing cadmium material and quantum dots not containing cadmium material. Since the quantum dots containing cadmium material has higher light emission efficiency and narrower FWHM of luminescence spectrum than the quantum dots not containing cadmium material, the display of the quantum dots containing cadmium material may have better energy-saving effect and brighter colors. However, since cadmium is a material of which the concentration is explicitly limited in a standard of Restriction of Hazardous Substances all over the world, and thus, how to reduce the content of cadmium to satisfy the specification of the ROHS while realizing the display with brighter colors and more energy-saving effect by using the quantum dots containing cadmium material has became an important research orientation.

SUMMARY

In order to resolve the above problem existing in the prior art, the present invention provides a backlight module, including: a reflection sheet, a light guide plate and an optical film group disposed from bottom to top; and a quantum dot film group disposed between the light guide plate and the optical film group;

a light source disposed to correspond to a side portion of the light guide plate, the light source including an excitation light source and a compensation light source, wherein the excitation light source is used to provide excitation light to enable the quantum dot film group to emit excitation red light and excitation green light entering the optical film group, and the compensation light source is used to provide compensation blue light to enable the quantum dot film group to emit blue light entering the optical film group.

The excitation light source is a blue LED or a near-ultraviolet LED.

An operating wavelength of the excitation light source is from 350 nm to 430 nm.

An operating wavelength of the compensation light source is from 445 nm to 470 nm.

The quantum dot film group includes:

a lower base layer;

a quantum dot layer bonded to a surface of the lower base layer through a bonding adhesive layer, and including red quantum dots and/or green quantum dots;

a selective transmission layer bonded to a surface of the quantum dot layer through a bonding adhesive layer, and including a first refractive layer and a second refractive layer that are periodically and alternatively laminated, parameters of the first and second refractive layers satisfying: a(xHLxH) b(yHLyH), wherein a and b represent integer numbers of periodical structures of the first and second refractive layers, respectively, and numeric ranges of a and b are greater than 5; x and y represent numeric values of refractive indexes of the first and second refractive layers, respectively, and numeric values of x and y both range from 0.01 to 2, x>y; $H=¼*\lambda/x$, where $\lambda$ represents a central wavelength of the visible light band; $L=¼*\lambda/y$, where $\lambda$ represents a central wavelength of the visible light band; and an upper base layer bonded to a surface of the selective transmission layer through a bonding adhesive layer.

A material of the quantum dot layer may be selected from at least one of CdSe, CdSe/ZnS, CdSe/CdS, CdSe/ZnSe, CuInS, InS, $CH_3PbX_3$, $CSPbX_3$, where X represents Cl, Br or I.

The quantum dot layer further includes a fluorescent material selected from:

fluoride $A_2[MF_6]:Mn^{4+}$, where A is selected from at least one of Ni, Na, K, Rb, Cs and $NH_4$, and M is at least one quadrivalent element selected from Ge, Si, Sn, Ti, Zr and Hf;

or $A_2A'M_{1-x}F_6:xMn^{4+}$, $0<x\leq0.3$, where x is a molar percentage coefficient of the doped $Mn^{4+}$ ion with respect to M, A is at least one of K, Rb and Cs, A' is at least one of Li, Na, K and Rb, and M is at least one of Al, Sc, V, Ga, Y, In, Gd, Lu and Bi.

A material of the first refractive layer is selected from polyethylene naphthalate or polyethylene glycol terephthalate. A material of the second refractive layer is selected from polymethyl methacrylate or polyethylene glycol terephthalate.

Materials of the lower base layer and the upper base layer are selected from polyethylene glycol terephthalate.

The Advantageous Effects (1) The backlight module provided by the present invention combines the quantum dot film group of the multi-layer organic film with the light source having two kinds of operating wavelengths. On one hand, the long-wavelength blue light is transmitted through the quantum dot film group, and on the other hand, the quantum dot film group is excited by the short-wavelength blue light to emit the red light and the green light, thereby obtaining three colors which may be blended as white light. The present invention can improve excitation efficiency of the quantum dots, reduce the amount of the quantum dots and the content of cadmium, and improve light energy utilization efficiency.

(2) In the quantum dot film group having multi-layer organic film, since the quantum dot layer is disposed between the upper base layer and the lower base layer, it can achieve an effect of isolating water and oxygen, and the quality and stability of the quantum dot layer obtain better reliability.

(3) In addition, the selective transmission layer is made of organic materials having high and low refractive indexes so that the backlight module can achieve a quite high transmittance (exceeding 95%) for the short-wavelength blue light and the near-UV light while having a quite high reflectance (exceeding 95%) for the long-wavelength blue light, the green and red lights without light collimation process, and can further significantly improve the light energy utilization efficiency and save cost.

BRIEF DESCRIPTION OF THE DRAWINGS

These and other aspects, features and advantages of embodiments of the present invention will become apparent from the following description, taken in conjunction with the accompanying drawings, in which.

DETAILED DESCRIPTION OF DETAILED EMBODIMENTS

Below, embodiments of the present invention will be described in details with reference to the drawings. However, the present invention can be implemented in numerous different forms, and should not be construed as particular embodiments set forth herein. Instead, these embodiments are provided for explaining the principle and actual application of the present invention, and thus, other skilled in the art can understand various embodiments and amendments which are suitable for specific intended applications of the present invention.

Figure 1:
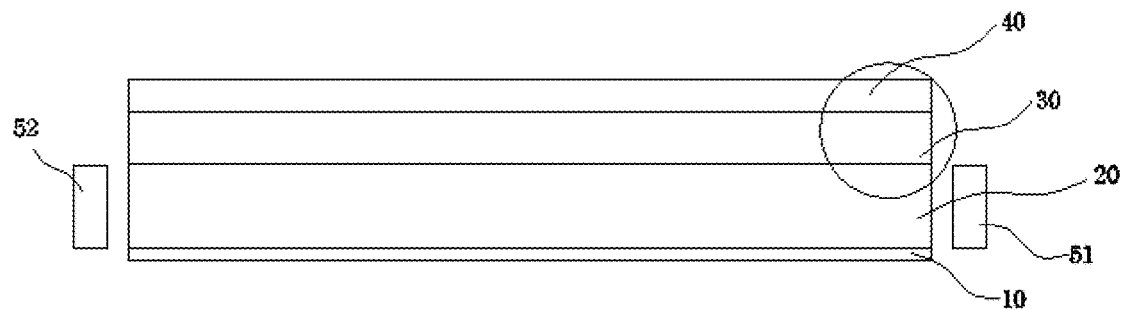
FIG. 1 is a structural diagram of a backlight module according to an embodiment of the present invention.

Referring to FIG. 1, a backlight module provided by the present invention comprises: a reflection sheet 10, a light guide plate 20, a quantum dot film group 30 and an optical film group 40 disposed from bottom to top; and a light source 50 disposed to correspond to a side portion of the light guide plate 20.

The present embodiment includes at least two kinds of light sources, i.e., an excitation light source 51 and a compensation light source 52. The excitation light source 51 is used to provide excitation light to enable the quantum dot film group 30 to emit excitation red light and excitation green light into the optical film group 40; and the compensation light source 52 is used to provide compensation blue light to enable the quantum dot film group 30 to emit blue light into the optical film group 40. The compensation light source 52 and the excitation light source 51 are disposed at left and right sides of the light guide plate 20, respectively, to correspond to the light guide plate 20. Certainly, the positions of the compensation light source 52 and the excitation light source 51 may be exchanged, or may be disposed in other arrangement manners that may satisfy the purpose of the present invention.

The operating wavelength of the excitation light source 51 falls within the wave band range of the short-wavelength blue light and the near-UV light. Actually, the excitation light source is preferably a blue light LED or an near-UV light LED, and the operating wavelength may be from 350 nm to 470 nm, and preferably 350 nm to 430 nm. An operating wavelength of the compensation light source may be long-wavelength blue light that may penetrate the quantum dot film group 30, and is preferably 445 nm to 470 nm. In fact, the operating wavelength of the compensation light source may shifted to the short-wavelength blue light, that is, the operating wavelength of the compensation light source is across two wave bands, which may re-excite the quantum dot film with a portion of the short-wavelength blue light in addition to providing the compensation blue light.

In addition, intensities and proportions of the two kinds of light sources are decided according to the finally matched screen color of a liquid crystal panel. For example, it is required that after the screen appears, a chromaticity of white point is $x=0.28\pm0.030$, $y=0.29\pm0.030$, and a chromaticity of the LED needs to satisfy $x=0.26\pm0.015$, $y=0.23\pm0.015$; and it merely needs to adjust the intensities of the two kinds of light sources and the proportion of red and green fluorescent powders to achieve the required LED chromaticity range.

Figure 2:
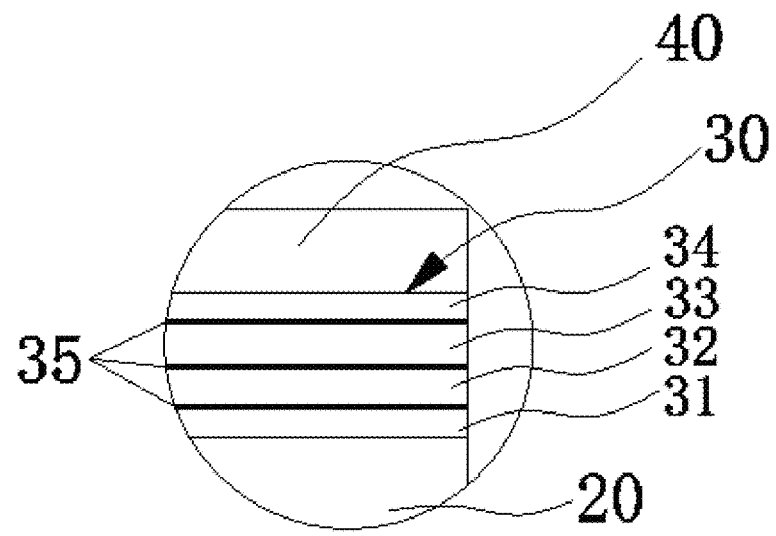
FIG. 2 is an enlarged view of a structure of an area within a circle of FIG. 1.

Referring to FIG. 2, the quantum dot film group 30 according to the embodiment of the present invention is formed by laminating a plurality of organic material layers, and includes four function layers from bottom to top, i.e.: a lower base layer 31, a quantum dot layer 32, a selective transmission layer 33 and an upper base layer 34, wherein the function layers are bonded to each other through a connection adhesive layer 35.

In particular, the lower base layer 31 located at the lowest layer is in direct contact with the light guide plate 20, and is manufactured of a PET material having a function of water proof and oxygen isolation. Similarly, the upper base layer 34 located at the uppermost layer is in direct contact with the optical film group 40, and is also manufactured of a PET material having the function of water proof and oxygen isolation.

Figure 4:
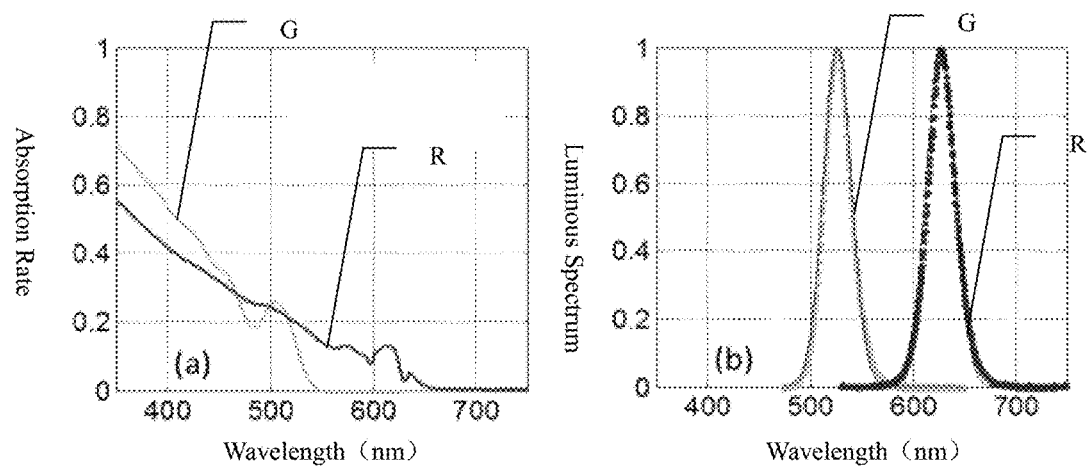
FIG. 4 is an absorption spectrum diagram (a) and a luminous spectrum diagram (b) of quantum dots for red light and green light in the prior art.

According to the current research, it can be found out that: since absorption characteristic of the quantum dots (as shown in FIGS. 4(*a*), 4(*b*)) indicates that by comparing the absorption and light emission performances with respect to the red light R and the green light G, the quantum dots have a better adsorption characteristic for the green light G having shorter wavelength and can emit the red light R and the green light G with high intensity, this characteristic is more beneficial for improving the light energy utilization efficiency and reducing the content of the quantum dots containing cadmium.

The quantum dot layer 32 according to the present embodiment is bonded to a surface of the lower base layer 31 through the bonding adhesive layer 35, and the purpose of the present invention is achieved by utilizing the characteristic of light selective absorption of the quantum dot layer 32 and cooperating the quantum dot layer 32 with the above light sources. The quantum dot layer 32 according to the present embodiment functions to reflect the near-UV light and the short-wavelength blue light, or a portion of the long-wavelength blue light, and meanwhile, the reflected near-UV light and the short-wavelength blue light, or the reflected portion of the long-wavelength blue light excite red quantum dots and green quantum dots in the quantum dot layer to improve the transmittance of the red light and the green light. According to this function setting, the quantum dot layer includes the red quantum dots and/or the green quantum dots (not shown in the drawings) that can be excited. A material of the quantum dot layer may be selected from at least one of CdSe, CdSe/ZnS, CdSe/CdS, CdSe/ZnSe, CuInS, InS, $CH_3PbX_3$ and $CSPbX_3$, where X represents Cl, Br or I.

In order to improve the excitation efficiency of the quantum dot layer, the quantum dot layer further includes a fluorescent material selected from:

fluoride $A_2[MF_6]:Mn^{4+}$, where A is selected from at least one of Ni, Na, K, Rb, Cs and $NH_4$, and M is at least one quadrivalent element selected from Ge, Si, Sn, Ti, Zr and Hf;

or $A_2A'M_{1-x}F_6:xMn^{4+}$, $0<x\leq0.3$, where x is a molar percentage coefficient of the doped $Mn^{4+}$ ion with respect to M, A is at least one of K, Rb and Cs, A' is at least one of Li, Na, K and Rb, and M is at least one of Al, Sc, V, Ga, Y, In, Gd, Lu and Bi.

Including the quantum dot layer corresponds to having "bullets", and it also needs to prepare a "gun". The selective transmission layer 33 is bonded to a surface of the quantum dot layer 32 through the bonding adhesive layer, which may precisely filter light and reflect the short-wavelength blue light and the UV light, and only the long-wavelength blue light, the red light and the green light can be transmitted. The selective transmission layer 33 includes a first refractive layer and a second refractive layer that are periodically and alternatively laminated.

The selective transmission layer 33 is formed by alternatively laminating the organic material having high and low refractive indexes. For example, the first refractive layer is a material having high refractive index selected from polyethylene naphthalate (PEN) or polyethylene glycol terephthalate (PET); and the second refractive layer adopts a material having low refractive index selected from polymethyl methacrylate (PMMA) or CoPEN formed by copolymerizing substances of ethylene glycol, naphthalic acid, phthalate and the like.

Furthermore, parameters of the first and second refractive layers satisfy: a(xHLxH)b(yHLyH), wherein a and b represent integer numbers of periodical structures of the first and second refractive layers, respectively, and numeric ranges of a and b are greater than 5;

x and y represent numeric values of refractive indexes of the first and second refractive layers, respectively, and numeric values of x and y both range from 0.01 to 2, x>y;

H and L represents optical thicknesses of the material layer, and $H=\frac{1}{4}*\lambda/x$, where $\lambda$ represents a central wavelength of the visible light band; and $L=\frac{1}{4}*\lambda/y$, where $\lambda$ represents a central wavelength of the visible light band. Generally, a value of $\lambda$ ranges from 500 nm to 550 nm, and the purpose thereof aims to make visible light as much as possible transmitted through the selective transmission layer.

An operating principle of the backlight module of the present invention is illustrated below in conjunction with FIG. 3.

Figure 3:
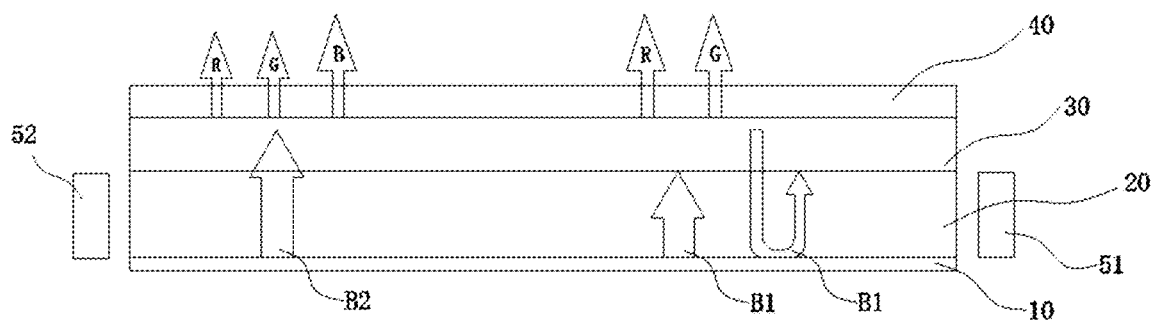
FIG. 3 is a diagram illustrating an operating principle of a backlight module according to an embodiment of the present invention.

Referring to FIG. 2 and FIG. 3, the excitation light source 51 provides short-wavelength blue light B1 (for example, peak wavelength is from 350 nm to 430 nm) entering the light guide plate 20, and the short-wavelength blue light B1 is emitted from the surface of the light guide plate 20 after it is reflected by the reflection sheet 10 and reaches the quantum dot film group 30. However, the short-wavelength blue light B1 cannot penetrate the quantum dot film group 30 and is reflected back, and excite the quantum dot material or the fluorescent powder of other colors in the quantum dot layer 32 to emit excitation red light R and excitation green light CG. The excitation red light R and the excitation green light G become sources of the red light and the green light that may penetrate the selective transmission layer 33 to enter the optical film group 40. Furthermore, a portion of the short-wavelength blue light B1 reflected back to the light guide plate 20 continues the previous route after being reflected by the reflection sheet 10, and since it always cannot penetrate through the selective transmission layer 33, it is reflected to the quantum dot layer 32 again to re-excite the quantum dot material and the fluorescent powder until the energy of the short-wavelength blue light B1 of this beam is exhausted.

In another aspect, the compensation light source 52 provides long-wavelength blue light B2 (for example, peak wavelength is from 445 nm to 470 nm), and a portion of the long-wavelength blue light B2 may penetrate through the selective transmission layer 33 to enter the optical film group 40 to become a source of blue light, thereby achieving the blending with the previous excitation red light R and the excitation green light G to be white light. A portion of the long-wavelength blue light B2 may excite a small amount of the quantum dots and fluorescent powder to also emit the excitation red light R and the excitation green light G as well so as to further increase intensities of the red light and the green light.

For example, in the present embodiment, the operating wavelength of the excitation light source is preset as the short-wavelength blue light, and is specifically 380 nm; the operating wavelength of the compensation light source is preset as the long-wavelength blue light, and is specifically 455 nm; the material of the first refractive layer is PEN, and the refractive index thereof is 0.32; and the material of the second refractive layer is PMMA, and the refractive index thereof is 0.25. The first refractive layer and the second refractive layer are periodically and alternatively laminated for preferably twenty times, and the layer most far away from the quantum dot layer 32 is generally set as the material layer having low refractive index, so that the periodic structure of the high and low refractive indexes is as follows: 20(0.32HL0.32H)20(0.25HL0.25H), and finally, the selective transmission layer 33 having a thickness of about 10 μm is formed.

Figure 5:
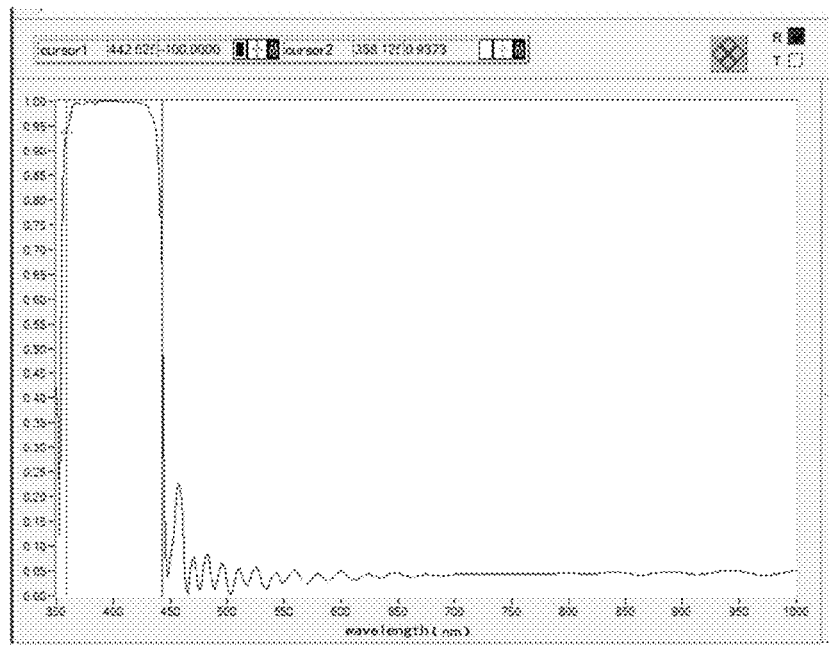
FIG. 5 is a reflection spectrum diagram of quantum dots film group at an incident angle of 0 degree according to an embodiment of the present invention.

Referring to FIG. 5, it can be seen that when an incident angle is 0 degree, the quantum dot film group of the present embodiment has quite good transmission characteristic for the wave band of the long-wavelength blue light and the red and green lights (of which the wavelength is greater than 440 nm), wherein the average transmittance is greater than 95%, and has a reflectivity greater than 95% for the wave band of the short-wavelength blue light (of which the wavelength is from 360 nm to 430 nm).

Figure 6:
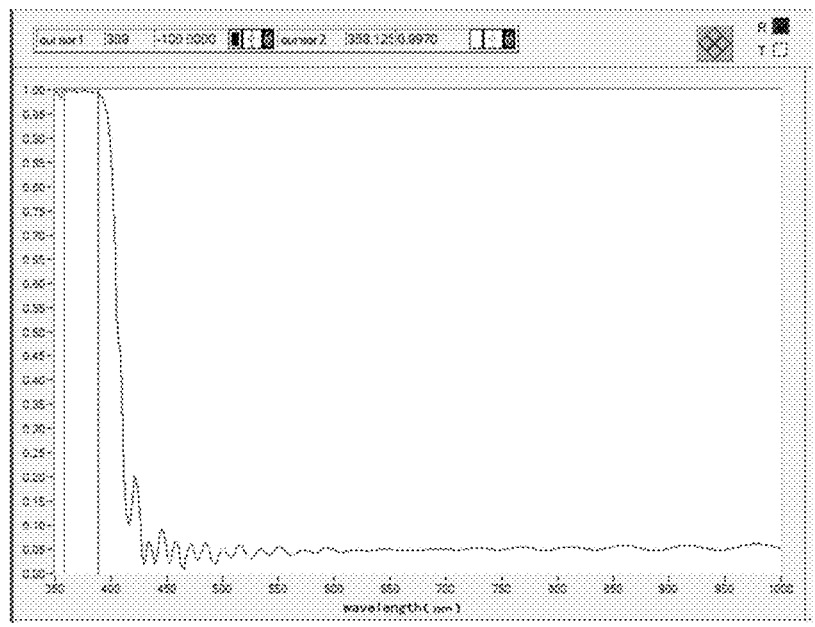
FIG. 6 is a reflection spectrum diagram of a quantum dot film group at an incident angle of 40 degrees according to an embodiment of the present invention.

In addition, the selective transmission layer of the present embodiment still has quite good transmission for the blue light and the reflective characteristic for the red and green lights with respect to the light beams incident at a large angle. Referring to FIG. 6, when the incident angle is 40 degrees, it can be seen that the quantum dot film group of the present embodiment has quite good transmission characteristic for the wave band of the long-wavelength blue light and the red and green lights (of which the wavelength is greater than 440 nm), wherein the average transmittance is greater than 95%, and has a reflectivity greater than 95% for the wave band of the short-wavelength blue light (of which the wavelength is 380 nm). Thus, the technical solution of combing the quantum dot film group of the present embodiment and the light source having two kinds of wavelengths may enable the backlight to achieve very high transmittance for the short-wavelength blue light without light collimation process, and have very high reflectivity for the long-wavelength blue light and the green and red lights, thereby significantly improving the light energy utilization efficiency and saving cost.

Although the present invention is illustrated and described with reference to particular exemplary embodiments, those skilled in the art will understand: various changes in form and details may be made therein without departing from the spirit and scope of the invention as defined by the appended claims and its equivalents.

What is claimed is:

1. A backlight module, comprising:
a reflection sheet, a light guide plate and an optical film group disposed from bottom to top;
a quantum dot film group disposed between the light guide plate and the optical film group; and
a light source disposed to correspond to a side portion of the light guide plate, the light source comprising an excitation light source and a compensation light source,
wherein the excitation light source is used to provide excitation light to enable the quantum dot film group to emit excitation red light and excitation green light entering the optical film group, and the compensation light source is used to provide compensation blue light to enable the quantum, dot film group to emit blue light entering the optical film group, and
wherein the quantum dot film group comprises:
a lower base layer;
a quantum dot layer bonded to a surface of the lower base layer through a bonding adhesive layer, and comprising red quantum dots and/or green quantum dots;
a selective transmission layer bonded to a surface of the quantum dot layer through a bonding adhesive layer, and comprising first refractive layers and second refractive layers that are periodically and alternatively laminated, wherein parameters of the first and second refractive layers satisfy: a(xHLxH)b(yH-LyH),
where a and b represent integer numbers of periodical structures of the first and second refractive layers, respectively, and numeric ranges of a and b are greater than 5: x and y represent numeric values of refractive indexes of the first and second refractive layers, respectively, and numeric values of x and y both range from 0.01 to 2, x>y; H represents an optical thickness of each first refractive layer, $H=\frac{1}{4}=\lambda/x$ where $\lambda$ represents a central wavelength of the visible light band; L represents an optical thickness of each second refractive layer, $L=\frac{1}{4}*\lambda/y$, where $\lambda$ represents a central wavelength of the visible light band; and
an upper base layer bonded to a surface of the selective transmission layer through a bonding adhesive layer.

2. The backlight module of claim 1, wherein the excitation light source is a blue LED or a near-ultraviolet LED.

3. The backlight module of claim 1, wherein an operating wavelength of the excitation light source is from 350 nm to 430 nm.

4. The backlight module of claim 1, wherein an operating wavelength of the compensation light source is from 445 nm to 470 nm.

5. The backlight module of claim 1, wherein a material of the quantum dot layer is selected from at least one of CdSe, CdSe/ZnS, CdSe/CdS, CdSe/ZuSe, CuInS, InS, $CH_3PbX_3$ and $CSPbX_3$, where X represents Cl, Br or I.

6. The backlight module of claim 1, wherein the quantum dot layer further comprises a fluorescent material selected from:
fluoride $A_2[MF_6]:Mn^{4+}$, where A is selected from at least one of Ni, Na, K, Rb, Cs and $NH_4$, and M is at least one quadrivalent element selected from Ge, Si, Sn, Ti, Zr and Hf;
or $A_2A'M_{1-x}F_6:xMn^{4+}$, $0<x\leq0.3$, where x is a molar percentage coefficient of the doped $Mn^{4+}$ ion with respect to M, A is at least one of K, Rb and Cs, A' is at least one of Li, Na, K and Rb, and M is at least one of Al, Sc, V, Ga, Y, In, Gd, Lu and Bi.

7. The backlight module of claim 1, wherein a material of the first refractive layer is selected from polyethylene naphthalate or polyethylene glycol terephthalate; and a material of the second refractive layer is selected from polymethyl methacrylate or polyethylene glycol terephthalate.

8. The backlight module of claim 1, wherein materials of the lower base layer and the upper base layer are selected from polyethylene glycol terephthalate.

9. A liquid crystal display, comprising the backlight module of claim 1.

10. The backlight module of claim 2, wherein an operating wavelength of the excitation light source is from 350 nm to 430 nm.

11. The backlight module of claim 5, wherein the quantum dot layer further comprises a fluorescent material selected from:
fluoride $A_2[MF_6]:Mn^{4+}$, where A is selected from at least one of Ni, Na, K, Rb, Cs and $NH_4$, and M is at least one quadrivalent element selected from Ge, Si, Sn, Ti, Zr and Hf;
or $A_2A'M_{1-x}F_6:xMn^{4+}$, $0<x\leq0.3$, where x is a molar percentage coefficient of the doped $Mn^{4+}$ ion with respect to M, A is at least one of K, Rb and Cs, A' is at least one of Li, Na, K and Rb, and M is at least one of Al, Sc, V, Ga, Y, In, Gd, Lu and Bi.

* * * * *